G. W. MILLER.
SHARPENER FOR LAWN MOWERS.
APPLICATION FILED MAY 28, 1913.

1,086,389.

Patented Feb. 10, 1914.

Witnesses
W. S. Waller
D. E. Waller

Inventor
George W. Miller
by W. X. Stevens.
Attorney

UNITED STATES PATENT OFFICE.

GEORGE W. MILLER, OF CHICAGO, ILLINOIS.

SHARPENER FOR LAWN-MOWERS.

1,086,389.  Specification of Letters Patent.  Patented Feb. 10, 1914.

Application filed May 28, 1913. Serial No. 770,426.

*To all whom it may concern:*

Be it known that I, GEORGE W. MILLER, a citizen of the United States, residing at Chicago, in the county of Cook and State of Illinois, have invented certain new and useful Improvements in Sharpeners for Lawn-Mowers, of which the following is a specification.

This invention relates to sharpeners for lawn mowers of that class in which a series of rotary knives revolve in shearing contact with a stationary blade, and its object is to adapt a sharpener carrier to be attached to lawn mowers of various styles of make and of different widths of cut, and to adapt a grinding bar and holder therefor.

Figure 1:
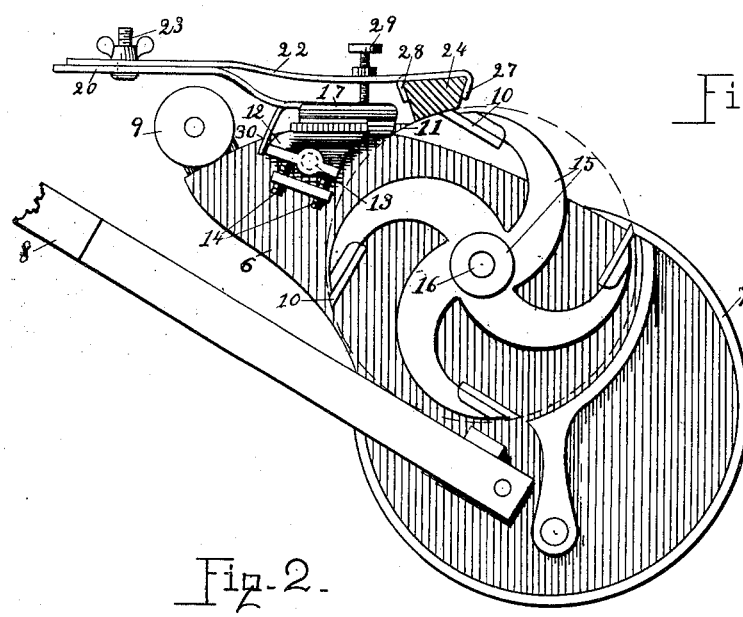
Figure 2:
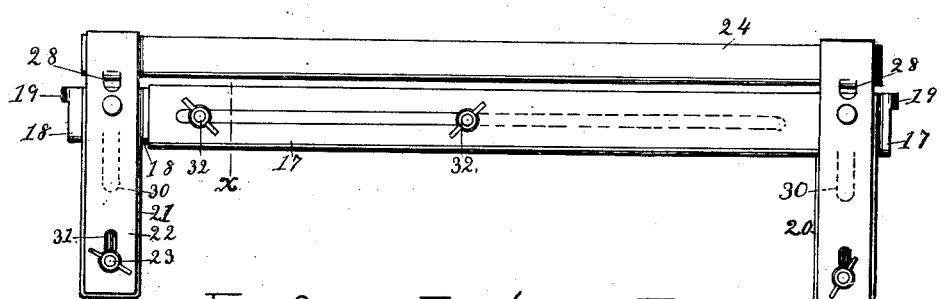
Figure 3:
Figure 4:
Figure 5:
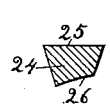

To this end my invention consists in the construction and combination of parts forming a sharpener for lawn mowers hereinafter more fully described and particularly stated in the claims, reference being had to the accompanying drawings, in which:

Figure 1 is a vertical section, partly in side elevation, of a part of a lawn mower inverted, showing my invention attached as in service. Fig. 2 is a top view of my sharpener. Fig. 3 shows a portion of the sharpener frame in longitudinal vertical section, and a gripping hook. Fig. 4 shows a transverse section of the body of the frame at line *x*, Fig. 2. Fig. 5 shows a transverse section of the grinder.

Numeral 6 represents a side cheek of a lawn mower, 7 one wheel, 8 the pushing handle, 9 the rear roller, 10 the rotary knives, 11 the stationary blade, 12 the crossbar to which the blade 11 is attached, 13 a trunnion on which the bar 12 may be rocked by the action of two adjusting screws 14 to carry the edge of the blade to or from the circular path of the knives 10. These knives are mounted on arms of a wheel 15, the shaft 16 of which engages the drive wheel 7 to be revolved thereby. The body of my sharpener comprises two portions 17 and 18 fitted to slide one upon the other to adapt one sharpener frame to mowing machines of different widths; a hook 19 at the outer end of each of the said portions 17, 18 to engage the blade 11 by hooking under its ends; and rearward projecting arms 20 and 21, which are integral with the body portions 17 and 18, respectively. A projection 30 depending from each arm engages the rear side of the blade bar 12 to keep the grinder frame from sliding forward. Grinder carriers 22 are secured to the arms 20 and 21 by means of binding bolts 23. The grinding bar 24 extends across the machine the whole length of the blade 11 tangent to the circular path of the knives 10. The grinding bar is broader on its back 25 than on its grinding face 26, and the back angles are acute dovetail-shaped in cross section—in order that the bar may be held firmly when forced endwise between two depending jaws 27 and 28 of each spring 22. The jaw 27 is formed by bending down the end of each spring, and the jaw 28 is punched down from the body of the spring, as shown in Fig. 2. A screw 29 in each spring, standing upon the body portion, limits the downward action of the spring to adjust the grinder relatively to the revolving blades. The grinder is located—as in my earlier application, Serial No. 760,520—just forward of the fixed blade 11, and each of the carrying springs 22 is slotted at 31 to permit such adjustment with the binding screws 23.

Every different width of lawn mower requires a grinder to be the same length as its fixed blade, but the two slotted body portions 17 and 18 and their binding bolts 32 adapt one grinder frame to be adjusted for all widths of lawn mowers, so it is necessary to make and carry in stock only one size of frames. The bodies and springs are preferably made of tough, somewhat elastic, sheet metal, like Bessemer steel, which may be punched and cold-pressed into the required form; stiffened by flanges, as at 33, and yet retain all the resilience required for the springs 22 without tempering.

To use this sharpener it is only necessary to invert a lawn mower as shown, attach and adjust the grinder and then push the machine along and the rotation of the knives against the grinder will do the sharpening; the particles of grit carried by the knives against the fixed blade sharpening that also. The grinder may be emery, corundum or other sharp, gritty material mounted on wood or other material, or all made of grit, to form a rigid dovetailed bar, as shown.

I claim:

1. In a sharpener for lawn mowers, a body in two parts fitted to slide one upon the other and means for securing them together; a bar of grinding material; a spring attached to each of the two body parts and shaped to engage the grinding bar, and means for securing the body directly upon the face of the fixed blade of the mower.

2. In a sharpener for lawn mowers, a body in two parts fitted to slide one upon the other; means for securing them together; a grinding bar; means for securing the bar to each of the said body parts; each of the body parts having a hook at one end for engaging the fixed blade of a mower, and a projection depending to engage the blade-carrying bar.

3. In a sharpener for lawn mowers, a body to rest upon the face of the stationary blade; means connected with the body for holding a grinder, and hooks to hook under the blade at its ends and engage the body with the blade.

In testimony whereof I affix my signature in presence of two witnesses.

GEORGE W. MILLER.

Witnesses:
 H. E. BANDLOW,
 BARTOW REED.